United States Patent [19]

Denny et al.

[11] 4,343,010

[45] Aug. 3, 1982

[54] RECORDER CONTROL CIRCUIT FOR SUPPRESSING INCIPIENT ARCING AT THE HEATING ELECTRODES

[75] Inventors: Richard W. Denny, Littleton; Paul A. Diddens, Denver, both of Colo.

[73] Assignee: Honeywell Inc., Minneapolis, Minn.

[21] Appl. No.: 242,968

[22] Filed: Mar. 12, 1981

[51] Int. Cl.³ .............................................. G01D 3/08
[52] U.S. Cl. ................................ 346/110 R; 219/216; 219/509; 361/91; 346/146
[58] Field of Search ............... 346/110 R, 139 C, 146; 219/216, 155, 383, 384, 388, 509; 361/91, 111, 112, 113

[56] References Cited

U.S. PATENT DOCUMENTS 4,165,512 8/1979 Peterson ......................... 219/216 X
4,177,469 12/1979 Peterson ......................... 346/110 R
4,213,136 7/1980 Jenkins et al. ............... 346/110 R X
4,267,434 5/1981 Simpson ..................... 346/110 R X

*Primary Examiner*—Joseph W. Hartary
*Assistant Examiner*—S. D. Schreyer
*Attorney, Agent, or Firm*—Lockwood D. Burton

[57] ABSTRACT

In an improved control circuit for the heating current of a system for developing latent photographic images on a heat developable medium, an incipient loss of tension in the record medium is sensed by detecting high frequency components of the energizing current incident to incipient arcing at the heating electrodes. The resulting signal is utilized to interrupt the flow of current to the heating electrodes, to prevent further arcing and the danger of fire. A time delay feature is incorporated to restore the heating current after a predetermined delay. If the tension in the record medium has not been restored, then the incipient arcing will again cause an interruption of the heating current.

8 Claims, 2 Drawing Figures

RECORDER CONTROL CIRCUIT FOR SUPPRESSING INCIPIENT ARCING AT THE HEATING ELECTRODES

BACKGROUND OF THE INVENTION

The present invention relates to recording apparatus. More particularly, it relates to an operational control circuit for such a recording apparatus.

In the art relating to recording technology, there has been designed a recording medium which is sensitive to light signals to produce a latent image thereof. The latent image may then subsequently be developed by the application of controlled quantities of heat to the record medium. One type of such recording medium includes the optically sensitive emulsion on one side of a base carrier member, such as paper, with an electrically conductive backing member secured to the opposite side of the base carrier. The development heat for latent images in the emulsion is generated by the passage of electrical current through the conductive backing surface of the record medium by passing that record medium over two or more electrode members. In practice, at least one of the electrode members is resiliently biased to engage the surface of the record medium as it is drawn, under tension, between a pair of drive members. It has been found that if the record medium is not maintained taught between the drive rollers and is allowed to accumulate a bit of slackness therein, the heating electrodes do not maintain intimate contact with the conductive surface on the record medium and produce arcing. Such arcing at the electrodes not only causes poor development of the recorded image, shortened life of the electrodes and carbon deposit accumulations but it also constitutes a serious problem in that the continued arcing may cause the record medium itself to burn even after tension is restored.

There have been a number of efforts made to mechanically or electro-mechanically sense the tension in the record medium as it is drawn across such electrodes, none of these have been entirely satisfactory.

SUMMARY OF THE INVENTION

It is, accordingly, an object of the present invention to provide an improved control circuit for an photographic recording system.

It is another object of the present invention to provide in an improved control circuit as set forth, means for detecting incipient tension loss in recording medium.

It is a further object of the present invention to provide, in an improved control circuit as set forth means for reducing the potential for fire in such a recording system.

In accomplishing these and other objects, there has been provided, in accordance with the present invention, an improved control circuit for the heating current of a system for developing latent photographic images on a heat developable medium. An incipient loss of tension in the record medium is sensed by detecting high frequency components of the energizing current incident to incipient arcing at the heating electrodes. The resulting signal is utilized to interrupt the flow of current to the heating electrodes, to prevent further arcing and the danger of fire. A time delay feature is incorporated to restore the heating current after a predetermined delay. If the tension in the record medium has not been restored, then the incipient arcing will again cause an interruption of the heating current.

BRIEF DESCRIPTION OF THE DRAWINGS

A better understanding of the present invention may be had from the following detailed description when read in the light of the accompanying drawings, in which.

DETAILED DESCRIPTION

Figure 1:
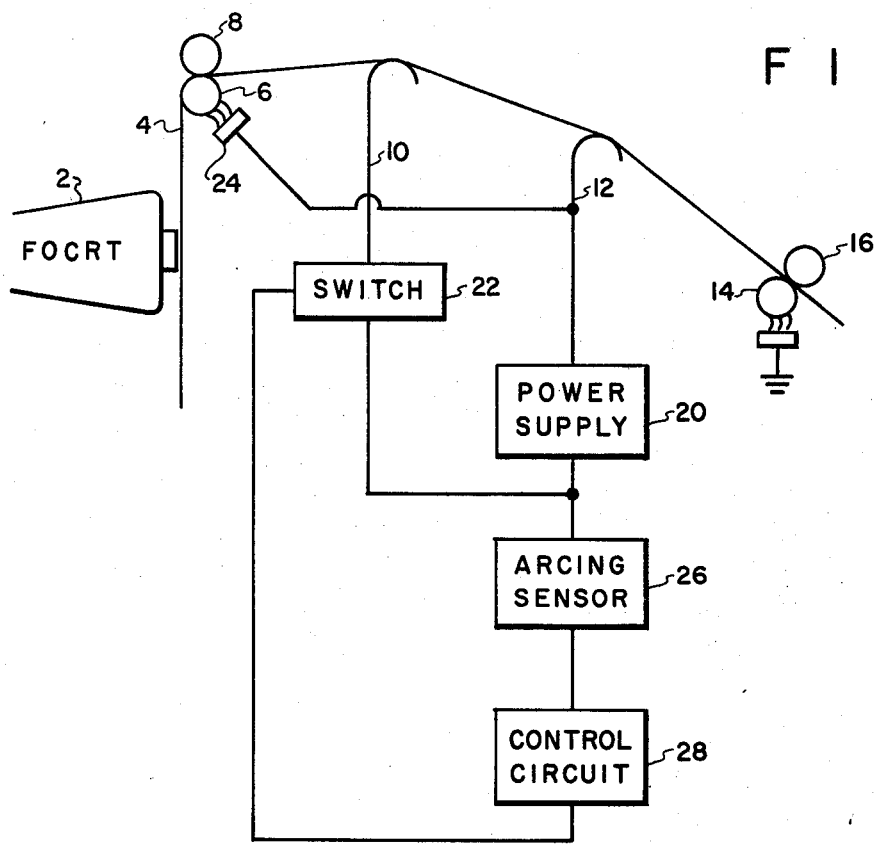
FIG. 1 is a block schematic diagram of a control circuit embodying the present invention.

Referring now to the drawings in more detail, there is shown in FIG. 1 a photographic recording system wherein a fiber optics-cathode ray tube 2 is energized to produce a light image on the fiber optics face thereof. An optically sensitive record medium 4 is drawn across the face of the fiber optics face of the CRT 2 and a latent image corresponding to the excitation of the face of the CRT is imparted onto the emulsion surface of the record member 4. That record member 4 is of the type having a photo sensitive emulsion on one side a base carrier member and an electrically conductive coating on the reverse side of the carrier member. Such recording medium is commercially available. The record medium 4 is drawn past the recording tube 2 by a first drive roller 6 and an associated pressure roller 8. The drive roller 6 may be, and preferably is, made of an electrically conductive material and engages the electrically conductive backing on the record member 4. The record member 4 is then drawn past a first and a second resilient electrode member 10 and 12, respectively, by a second drive roller 14 in association with its pressure roller 16. The drive roller 14 is also preferably made of an electrically conductive material and is connected through a brush assembly 18 to ground.

The second drive roller 14 is slightly overdriven with respect to the first drive roller 6, with slippage, in order to maintain the tension in the record medium 4. A power supply 20 has one terminal thereof connected to the second resilient electrode member 12 and the other terminal thereof connected, through a switch 22, to the first resilient electrode 10. The electrode 12 may be and preferably is connected through a brush assembly 24 to the first drive roller 6. When the switch 22 is closed, electrical energy is applied from the power supply 20 to the first resilient electrode 10 thence through the conductive backing on the record member 4 to the first drive roller 6 and the second resilient electrode 12, back to the other side of the power supply 20.

To the junction between the power supply 20 and the switch 22 there is connected an arcing sensor 26, the output of which is connected to a control circuit 28. The output of the control circuit 28 is connected to control the operation of the switch 22.

When the tension in the record member 4 begins to slacken, an incipient arcing begins between either or both of the two resilient electrodes and the conductive backing of the record member 4. The arcing superimposes a high frequency signal on the power supply circuit. This high frequency signal is detected by the arcing sensor 26 and, when so detected, energizes the control circuit 28 to cause the switch 22 to be opened. The opening of the switch 22 causes the energization of the conductive backing of the record member 4 to be interrupted.

The control circuit 28 is provided with a delay feature whereby after a predetermined delay, the switch 22 will again be closed to energize the electrodes 10, 12 and 6. If the driving rollers have again established proper tension in the record medium 4, the operation of the system will continue as normal. If, on the other hand, tension has not been restored, the incipient arcing will again be detected and the switch opened.

Figure 2:
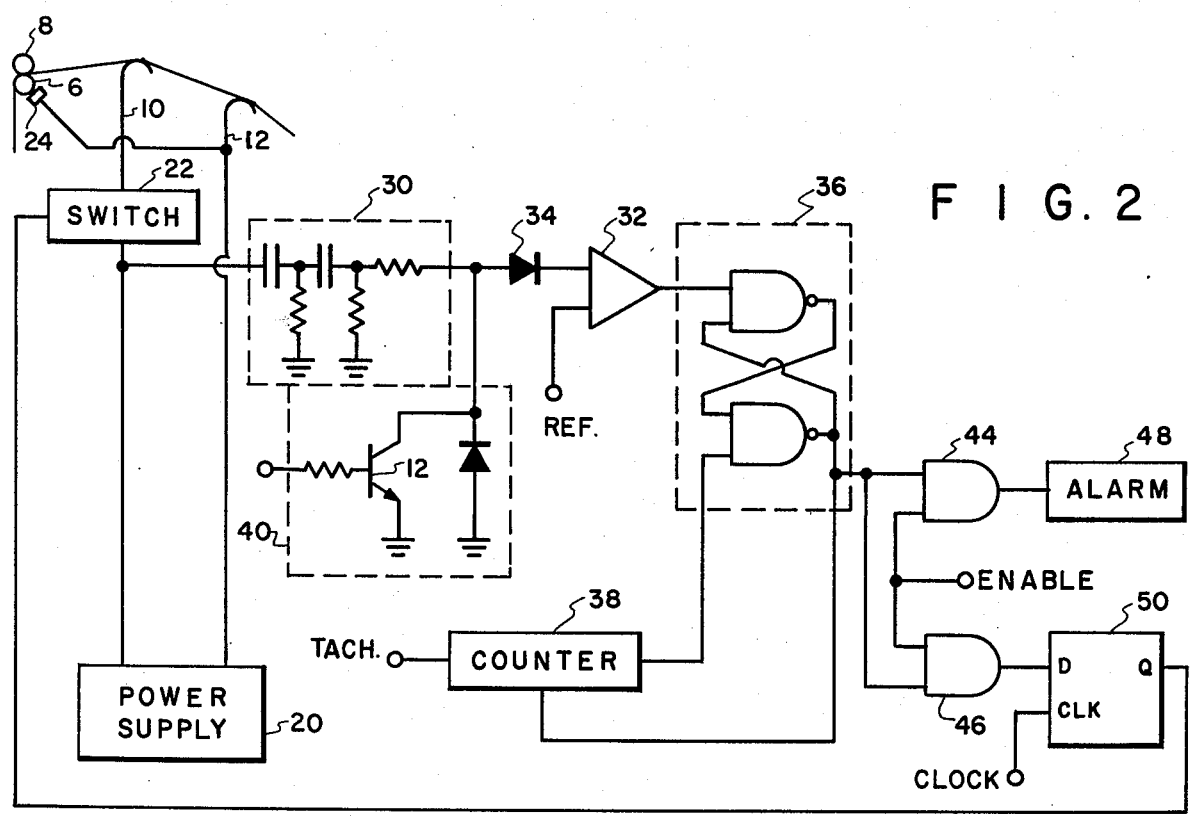
FIG. 2 is a schematic diagram showing in greater detail the structure illustrated in FIG. 1.

In FIG. 2 there is shown, in greater detail, circuit elements comprising the structure shown in block diagram form in FIG. 1. Here again, the record medium 4 is drawn, in tension, over a pair of resilient heating electrodes 10 and 12 as well as by a conductive roller 6. A power supply unit 20 again has one of the output terminals connected to the resilient electrode 12 and, through the brush assembly 24 to the conductive roller 6. The second output terminal of the power supply unit 20 is connected through a switch assembly 22 to the other resilient electrode 10. So long as the switch assembly 22 is closed, electrical current flows from the power supply unit 20 to the resilient electrode 10 thence through the conductive backing of the record member 4 to the second resilient electrode 12 and to the conductive roller 6, back to the other terminal of the power supply unit 20. When, on occasion, a slackness begins to appear in the record medium 4 to the extent that incipient arcing occurs at one or the other of the resilient electrodes 10 or 12, a high frequency signal is generated incident to the incipient arcing and is superimposed upon the power supply current line. That superimposed high frequency signal is detected by a high frequency detector circuit. The high frequency detector circuit includes a high-pass filter 30. One input of a threshold detector 32 is connected to the output of the high-pass filter through a diode 34. The other input of the threshold detector 32 is connected to a source of reference voltage which may be on the order of one volt. The output of the threshold detector 32 is connected to one input terminal, for example the SET input, of a flip-flop 36. A second input, for example the RESET input, of the flip-flop 36 is connected to the output of a counter 38. The input to the counter 38 is a tachometer signal derived from the drive mechanism for the record medium 4. An output from the flip-flop 36 is connected to enable the counter 38 whenever the flip-flop 36 is set. An inhibit or delay circuit 40 which includes a transistor 12 is connected between the output of the high-pass filter 30 and ground.

The output of the flip-flop 36 is also connected to a first input of each of a pair of AND gates 44 and 46, respectively. A second input terminal of each of the two AND gates 44 and 46 is connected to an enable signal which is derived from other part of the circuitry not included within the present invention. The output of the gate 44 is connected to the input of an alarm circuit 48 which may be used to actuate an alarm signal means to alert an operator to the existing condition. The output of the gate 46 is connected to an input of a flip-flop 50. The flip-flop 50 is periodically enabled by a clock signal which is generated by control circuitry not a part of the present invention. The Q output of the flip-flop 50 is connected to a control input terminal for the switch assembly 22.

When, as noted, a slack occurs in the tape an incipient arcing occurs, the resulting high frequency signals are translated through the high-pass filter 30 and the diode 34 to the threshold detector 32. When the resulting high frequency signal reaches the level of the threshold detector, an output signal is generated by the threshold detector 32 and applied to the SET input of the flip-flop 36. The setting of the flip-flop 36 causes an output signal to be, first, transmitted to enable the counter 38, allowing the counter 38 to begin a predetermined count. The output signal from the flip-flop 36 is also applied to the enabled gates 44 and 46. The output of the gate 44 in turn actuates the alarm circuit 48 to alert the operator to the alarm condition. The output of the gate 46 sets the flip-flop 50, the output of which is then connected to actuate the switch 22 to open that switch and cause an interruption to the flow of current through the electrodes 10 and 12 as well as the conductive roller 6 to the conductive backing on the record member 4.

This interruption of the current through the record member, under arcing conditions, is effective to prevent damage to the system through a potential for burning of the record member. The interruption of the flow of current in the incipient arcing stage also provides means for avoiding such other disadvantages as decreased life of the contact elements due to the arcing burning thereof; it prevents the accumulation of carbon deposits from burned portions of the conductive backing; and it minimizes the occurrence of burn marks which would appear on the front surface of the record member if the arcing were allowed to continue.

In order to prevent the system from being locked up in the inactive state on the occasion of the first incidence of incipient arcing, there is provided a delayed restore arrangement. It will be recalled that the output signal from the setting of the flip-flop 36 enabled the counter 38. Tachometer signals derived from the driving system for the record medium 4 is applied to the input of the counter. When a predetermined count has been achieved in the counter 38, representative of the passage of a predetermined length of the record medium, the counter 38 will provide an output signal to reset the flip-flop 36. The resetting of the flip-flop 36 removes the alarm signal from the outputs of the gates 44 and 46 and allows the flip-flop 50 to be reset on the next clock signal. Resetting the flip-flop 50 allows the switch assembly 22 to again be closed, restoring the energization of the conductive backing on the record medium 4. In an exemplary embodiment constructed in accordance with the present invention, the predetermined count in the counter 38 was chosen to represent approximately 1 Centimeter of record member 4. Since it is a tachometer signal that is being counted, the output representation is independent of record speed.

It has also been determined, that switching transients are encountered when the energization of the respective electrodes is switched on and off during the control of the heating cycle. To inhibit those switching transients from being mistakenly detected as arcing signals, an inhibit signal coincident with each of the switching controls and approximately 60 microseconds in length is applied to the input terminal of the delay circuit 40. That inhibit signal causes the transistor 42 to become conductive for about 60 microseconds, shorting out or inhibiting the output of the high-pass filter 30 for that interval. That interval is sufficiently long to accommodate the switching transients without interferring with the proper operation of arcing detection circuit.

Thus there has been provided, in accordance with the present invention, an improved control circuit for the control of heating current in heat developable photographic recording system.

The embodiments of the present invention in which an exclusive property or privilege is claimed are defined as follows:

1. In a recording system wherein latent images on a recording medium are developed by the application of heat to said recording medium and wherein said heat is generated by the passage of electrical energy through a conductive backing on said record medium and between two or more electrode means contacting said conductive backing, the improvement comprising a control circuit for controlling the passage of said electrical energy through said conductive backing on the occurrence of an impending loss of contact between said backing and one or more of said electrodes means, said control circuit comprising:

power supply means connected for energizing said electrode means;

switch means connected between said power supply means and said electrode means;

sensing means connected to said power supply means to sense incipient electrical arcing between one or more of said electrode means and said backing, and to provide a first signal indicative of said incipient arcing;

control means connected to said sensing means to be responsive to said first signal to produce a control signal; and means connecting said control means to said switch means to open said switch means in response to said control signal.

2. A control circuit as set forth in claim 1 wherein said sensing means includes a high-pass filter to pass high, frequency signals produced incident to said incipient arcing.

3. A control circuit as set forth in claim 2 wherein said sensing means includes a threshold detector connected to the output of said high-pass filter.

4. A control circuit as set forth in claim 1 wherein said control means includes a delayed restore means to terminate, after a predetermined interval said control signal and thereby to restore the energization of said electrode means.

5. A control circuit as set forth in claim 4 wherein said restore means includes a counter member connected to count said predetermined interval after initiation of said first signal.

6. A control circuit as set forth in claim 5 wherein said control means includes a flip-flop connected to be set by said first signal and reset by a signal from said counter member, said counter being connected to an output of said flip-flop to be reset by the setting of said flip-flop.

7. A control circuit as set forth in claim 1 and further including an alarm signal means connected to be activated by said control signal.

8. A control circuit as set forth in claim 1 and further including an inhibit circuit means connected to said sensing means and responsive to a switching transient inhibit signal to inhibit the provision of said first signal during switching transients.

* * * * *